United States Patent
Kroeger et al.

(10) Patent No.: US 9,178,548 B1
(45) Date of Patent: Nov. 3, 2015

(54) FIRST ADJACENT CANCELLER (FAC) WITH IMPROVED BLENDING USING A PARAMETRIC FILTER

(71) Applicant: iBiquity Digital Corporation, Columbia, MD (US)

(72) Inventors: Brian W. Kroeger, Sykesville, MD (US); Paul J. Peyla, Elkridge, MD (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 14/257,286

(22) Filed: Apr. 21, 2014

(51) Int. Cl.
H04B 1/10 (2006.01)

(52) U.S. Cl.
CPC .............. *H04B 1/1036* (2013.01); *H04B 1/109* (2013.01); *H04B 2001/1045* (2013.01); *H04B 2001/1063* (2013.01)

(58) Field of Classification Search
CPC ................. H04B 1/1036; H04B 1/109; H04B 2001/1063; H04B 2001/1045
USPC .......................................................... 370/350
See application file for complete search history.

(56) References Cited

U.S. PATENT DOCUMENTS

| | | | |
|---|---|---|---|
| 5,355,533 A * | 10/1994 | Dickerson | 455/306 |
| 5,428,834 A * | 6/1995 | Dickerson | 455/304 |
| 6,259,893 B1 | 7/2001 | Kroeger et al. | |
| 6,603,826 B1 * | 8/2003 | Cupo et al. | 375/346 |
| 6,622,008 B2 | 9/2003 | Kroeger et al. | |
| 6,671,340 B1 | 12/2003 | Kroeger et al. | |
| 7,221,917 B2 | 5/2007 | Kroeger et al. | |
| 7,287,050 B2 | 10/2007 | Christoph | |
| 7,933,368 B2 | 4/2011 | Peyla et al. | |
| 2001/0050926 A1 * | 12/2001 | Kumar | 370/529 |
| 2009/0079656 A1 * | 3/2009 | Peyla et al. | 343/860 |
| 2013/0029585 A1 | 1/2013 | Kroeger et al. | |

OTHER PUBLICATIONS

Kroeger, Brian W., "Compatability of FM Hybrid In-Band On-Channel (IBOC) System for Digital Audio Broadcasting", IEEE Transactions on Broadcasting, vol. 43, No. 4, Dec. 1997.

* cited by examiner

*Primary Examiner* — Juan A Torres
(74) *Attorney, Agent, or Firm* — Robert P. Lenart, Esq.; Pietragallo Gordon Alfano Bosick & Raspanti, LLP

(57) ABSTRACT

A method for processing a radio signal includes: receiving an FM in-band on-channel radio signal including a plurality of digitally modulated subcarriers in upper and lower sidebands; sampling the FM in-band on-channel radio signal to produce an input signal including complex digital samples of a combination of a desired one the upper and lower sidebands and an FM interferer; removing FM interferer components from the first signal by notch filtering to produce a notch-filtered signal; weighting the notch-filtered signal to produce a weighted notch-filtered signal; using a parametric filter to filter the input signal to produce a parametric-filtered input signal; and combining the weighted notch-filtered signal and the parametric-filtered input signal to produce an output signal. A radio receiver that implements the method is also included.

20 Claims, 9 Drawing Sheets

US 9,178,548 B1

FIRST ADJACENT CANCELLER (FAC) WITH IMPROVED BLENDING USING A PARAMETRIC FILTER

FIELD OF THE INVENTION

This invention relates to methods and apparatus for receiving and processing in-band, on-channel radio signals, and more particularly to methods and apparatus for reducing the effects of interference from FM signals in adjacent radio channels.

BACKGROUND OF THE INVENTION

The iBiquity Digital Corporation HD Radio™ system is designed to permit a smooth evolution from current analog amplitude modulation (AM) and frequency modulation (FM) radio to a fully digital in-band on-channel (IBOC) system. This system delivers digital audio and data services to mobile, portable, and fixed receivers from terrestrial transmitters in the existing medium frequency (MF) and very high frequency (VHF) radio bands.

IBOC signals can be transmitted in a hybrid format including an analog modulated carrier in combination with a plurality of digitally modulated subcarriers, or in an all-digital format wherein the analog modulated carrier is not used. Using the hybrid format, broadcasters may continue to transmit analog AM and FM simultaneously with higher-quality and more robust digital signals, allowing themselves and their listeners to convert from analog to digital radio while maintaining their current frequency allocations. IBOC hybrid and all-digital waveforms are described in U.S. Pat. No. 7,933,368, which is hereby incorporated by reference.

Signals from adjacent radio channels can interfere with the digitally modulated carriers of a hybrid IBOC signal. A First Adjacent Canceller (FAC) technique can be used to mitigate the effects of first-adjacent FM interference to the digital sidebands of an HD Radio signal in the FM broadcast band.

SUMMARY

In one aspect of the invention, a method for processing a radio signal includes: receiving an FM in-band on-channel radio signal including a plurality of digitally modulated subcarriers in upper and lower sidebands; sampling the FM in-band on-channel radio signal to produce an input signal including complex digital samples of a combination a desired one the upper and lower sidebands and an FM interferer; removing FM interferer components from the first signal by notch filtering to produce a notch-filtered signal; weighting the notch-filtered signal to produce a weighted notch-filtered signal; using a parametric filter to filter the input signal to produce a parametric-filtered input signal; and combining the weighted notch-filtered signal and the parametric-filtered input signal to produce an output signal.

In another aspect of the invention, a radio receiver including: an input receiving an original FM in-band on-channel radio signal including a plurality of digitally modulated subcarriers in upper and lower sidebands; and processing circuitry for sampling the FM in-band on-channel radio signal to produce an input signal including complex digital samples of a combination a desired one the upper and lower sidebands and an FM interferer, removing FM interferer components from the first signal by notch filtering to produce a notch-filtered signal, weighting the notch-filtered signal to produce a weighted notch-filtered signal, using a parametric filter to filter the input signal to produce a parametric-filtered input signal, and combining the weighted notch-filtered signal and the parametric-filtered input signal to produce an output signal.

DETAILED DESCRIPTION

The following description describes various embodiments of a method and apparatus that provide improved First Adjacent Canceller (FAC) performance by weighting the blending of at least a portion of an original input signal with an FAC-processed signal.

Figure 1:
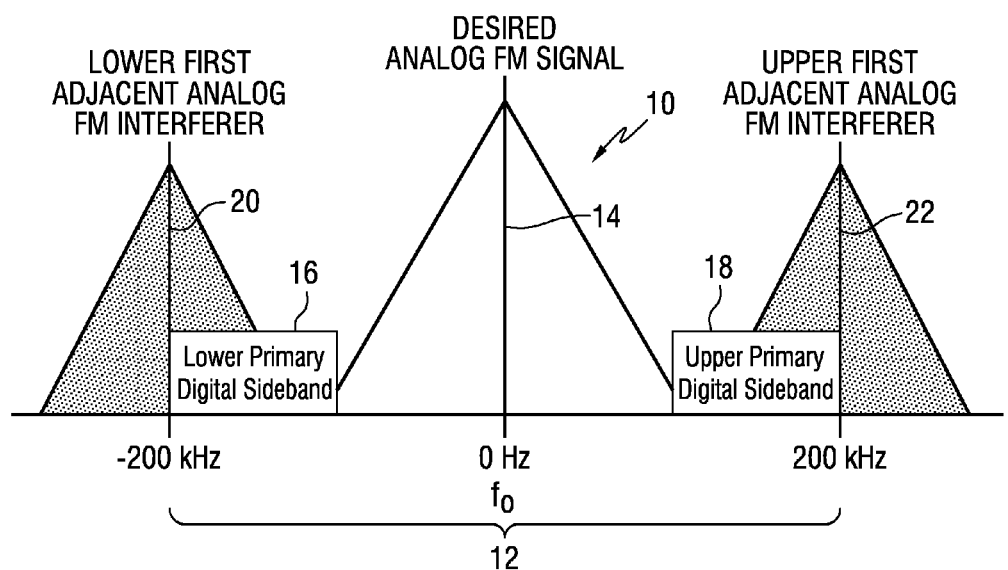
FIG. 1 is a schematic diagram of a hybrid FM IBOC signal and two adjacent channel signals.

The first adjacent canceller mitigates the effects of first-adjacent analog FM interference on spectrally coincident primary digital sidebands of an IBOC signal. The potential spectral overlap of first-adjacent analog and digitally modulated portions of an IBOC signal is illustrated in FIG. 1. FIG. 1 is a schematic diagram of a hybrid FM IBOC signal 10 in a first channel 12 that spans about ±200 kHz from this center frequency $f_o$. Signal 10 includes an analog modulated carrier 14 and pluralities of digitally modulated subcarriers in lower and upper primary sidebands 16 and 18 (also referred to in this description as digital sidebands). Each sideband includes a plurality of subcarriers that are modulated by a digital signal using orthogonal frequency division modulation. Lower and upper adjacent channels are centered at −200 kHz and +200 kHz with respect to the center of channel 12. FIG. 1 shows a lower first adjacent analog FM interferer 20 centered at −200 kHz from the center of channel 12, and an upper first adjacent analog FM interferer 22 centered at +200 kHz from the center of channel 12. The lower first adjacent analog FM interferer 20 overlaps at least a portion of the lower primary digital sideband and interferes with the subcarriers of that sideband. Similarly, the upper first adjacent analog FM interferer 22 overlaps at least a portion of the upper primary digital sideband and interferes with the subcarriers of that sideband.

Additional IBOC DAB hybrid and all-digital waveforms are described in U.S. Pat. No. 7,933,368, which is hereby incorporated by reference. While the FM spectra of the analog modulated signals in FIG. 1 are shown as triangular, it will be recognized by those skilled in the art that these spectra are more accurately characterized as bell-shaped.

Figure 2:
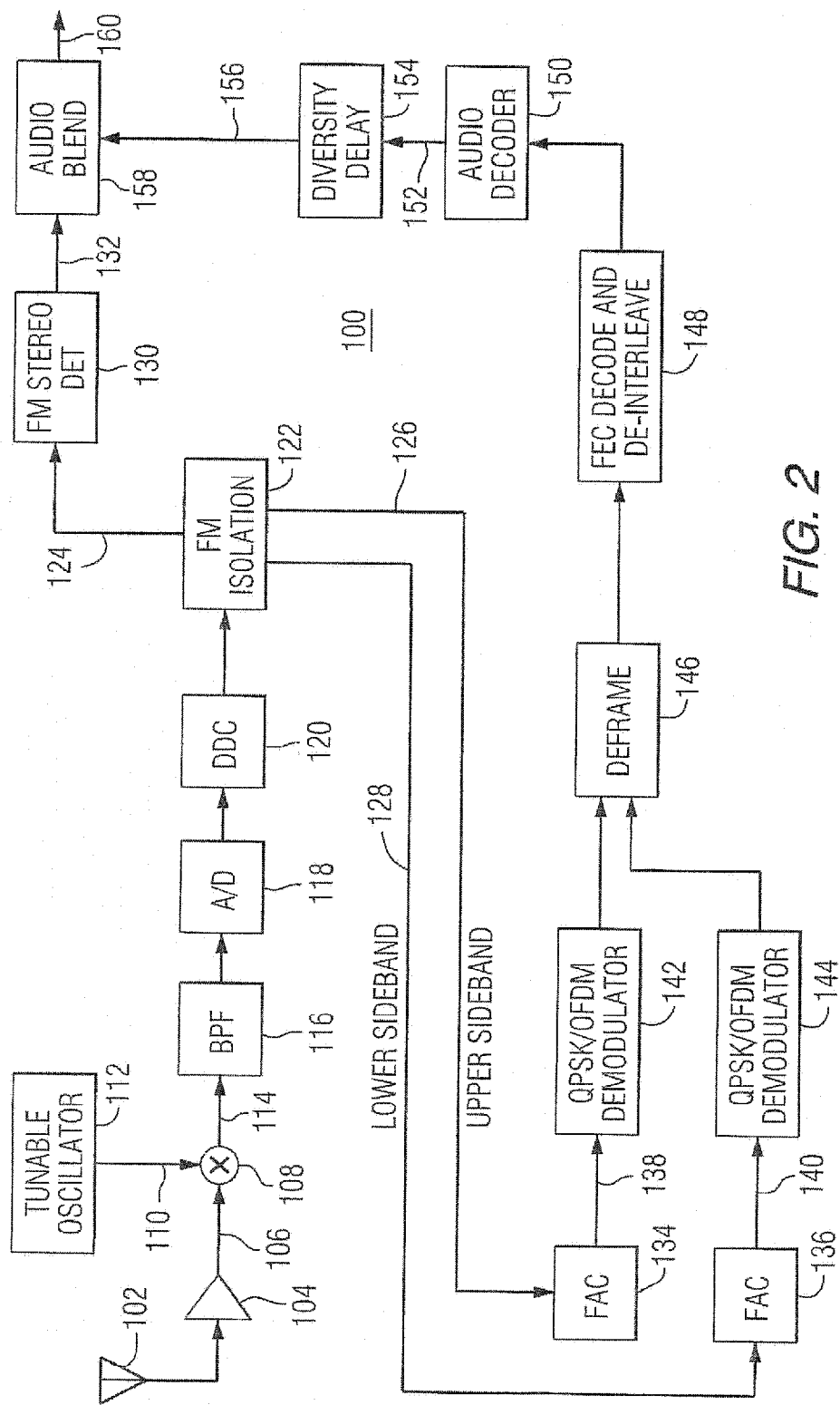
FIG. 2 is a simplified functional block diagram of an FM IBOC receiver.

FIG. 2 is a simplified functional block diagram of an FM IBOC receiver 100, showing portions of a receiver described in U.S. Pat. No. 7,221,917. Antenna 102 serves as a means for receiving an in-band on-channel digital audio broadcast signal including a signal of interest in the form of an analog modulated FM carrier and a plurality of OFDM digitally modulated subcarriers located in upper and lower sidebands with respect to the analog modulated FM carrier. The receiver includes a front end circuit 104 that is constructed in accordance with well known techniques. The signal on line 106 from the front end is mixed in mixer 108 with a signal on line 110 from a local oscillator 112 to produce an intermediate frequency (IF) signal on line 114. The IF signal passes through a bandpass filter 116 and is then digitized by an analog-to-digital converter 118. A digital down converter 120 produces in-phase and quadrature baseband components of the composite signal. The composite signal is then separated by FM isolation filters 122 into an analog FM component on line 124 and upper and lower sideband components on lines 126 and 128. The analog FM stereo signal is digitally demodulated and demultiplexed as illustrated in block 130 to produce a sampled stereo audio signal on line 132.

The upper and lower sidebands are initially processed separately after the isolation filters. The baseband upper sideband signal on line 126 and the baseband lower sideband signal on line 128 are separately processed by a first adjacent canceller as illustrated by blocks 134 and 136, to reduce the effect of first adjacent interference. The resulting signals on lines 138 and 142 are demodulated as illustrated in blocks 142 and 144. After demodulation, the upper and lower sidebands are combined for subsequent processing and deframed in deframer 146. Next the signal is FEC decoded and de-interleaved as illustrated by block 148. An audio decoder 150 recovers the audio signal. The audio signal on line 152 is then delayed as shown in block 154 so that the stereo signal on line 156 is synchronized with the sampled analog FM stereo signal on line 132. Then the stereo signal and the sampled analog FM stereo signal are blended as shown in block 158, to produce a blended audio signal on line 160.

In one aspect of the invention, an improvement in the FAC is accomplished using a parametric filter controlled by the estimated relative levels of the desired digital sideband and the FM interferer. The filter is frequency-shaped such that digital subcarriers near the center of the first-adjacent FM interferer (i.e., +200 kHz) are suppressed more than the inner subcarriers (nearer to +100 kHz). This accommodates the frequency-dependent interference characteristic of the adjacent channel FM interferer, where more bell-shaped interference power spectral density is concentrated near the center frequency of the interferer. Furthermore, this implementation improves simplicity and efficiency over previous implementations by vectorizing some of the operations. As described below, replacing the recursive IIR filters of previous FAC implementations with nonrecursive filters (i.e., FIR vector summing) allows for more efficient implementation in a digital signal processor.

Figure 3:
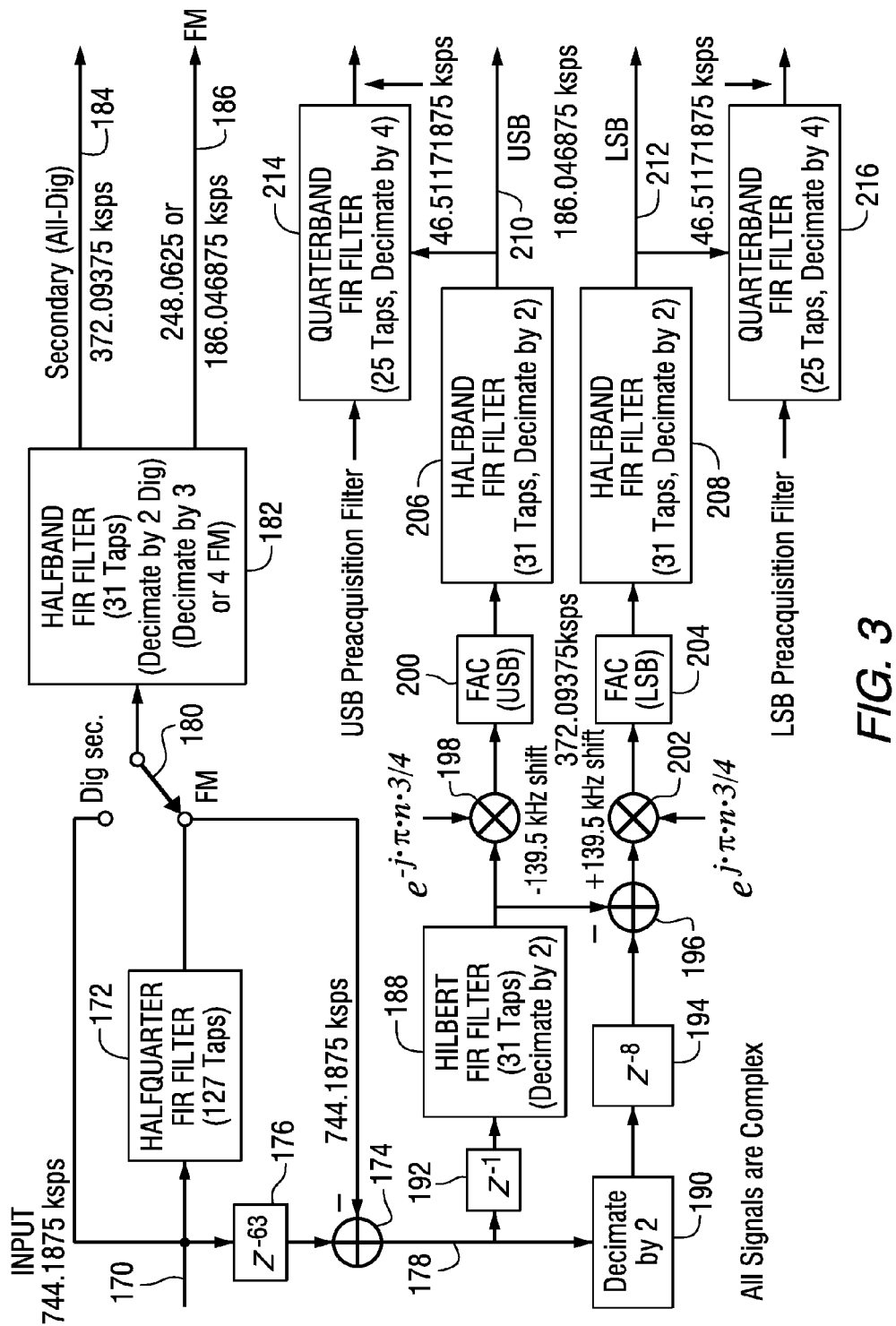
FIG. 3 is a functional block diagram of isolation filters.

In one embodiment of the invention, the first adjacent canceller is embedded within the isolation filter section of the receiver. FIG. 3 is a high-level block diagram of a portion of an HD Radio receiver with isolation filters to separate the upper and lower digital sidebands. The isolation filters separate the upper and lower primary digital sidebands from either the analog FM signal (in a hybrid IBOC waveform) or the secondary digital subcarriers (in an all-digital IBOC waveform). This separation allows the analog FM signal and digital sidebands to be sampled at a lower rate for subsequent efficient processing, and enables independent signal acquisition and FAC processing on either digital sideband. In FIG. 3, all signals are complex.

In the example of FIG. 3, an input signal at a sample rate of 744.1875 ksps is supplied on line 170. Halfquarter FIR filter 172 filters the analog modulated portion of the input signal to produce an FM output that is subtracted at combiner 174 from the input signal that has been delayed as shown in block 176. This produces a signal on line 178 representing the signal on the digitally modulated subcarriers of the received IBOC signal. Switch 180 connects the digital input signal or the filtered FM signal to a halfband FIR filter 182, to produce a secondary all-digital signal on line 184 and a sampled FM signal on line 186.

The signal on line 178 is separated into upper and lower digital sideband signals as shown by the Hilbert FIR filter 188, decimate by two block 190, delays 192 and 194, and combiner 196. The upper digital sideband signal is frequency shifted as shown by multiplier 198 and passed to an upper sideband first adjacent canceller 200. The lower digital sideband signal is frequency shifted as shown by multiplier 202 and passed to a lower sideband first adjacent canceller 204.

Following first adjacent cancellation, the upper and lower sideband signals are passed through halfband FIR filters 206 and 208 respectively to produce an upper sideband signal on line 210 and a lower sideband signal on line 212. An upper sideband preacquistion filter 214 and a lower sideband pre-acquisition filter 216 are also included.

In the example of FIG. 3, the isolation filters of FIG. 3 operate at a complex sample rate of about 372 kHz, and independently process the upper and lower primary digital sidebands. Complex baseband digital samples are input to the isolation filters at a rate of 744,187.5 samples per second from a typical IBOC HD Radio receiver tuner module. The input signal is generated in an HD Radio tuner module with a digital output sampled at 744.1875-kHz complex sample rate, and can be derived from an FM analog, FM hybrid, or FM all-digital signal. The input passband should span approximately ±275 kHz on either side of center frequency to accommodate FAC processing.

The primary sideband isolation filter should have linear phase and a minimum output sample rate consistent with passband characteristics. To accommodate digital subcarriers in extended primary sidebands, as well as FAC processing, the upper and lower sidebands should each have a passband located between 100 kHz and 270 kHz from center frequency. This filter can be designed using a 2-stage decimate-by-4 output sample rate (186.046875 ksps). The FAC processing is performed between the filter stages at 372 ksps to mitigate FAC-induced aliasing of noise-like FAC artifacts.

FIG. 3 shows that the output sample rate of the Hilbert filter is one half the input sample rate. This decimation-by-2 results in efficient filtering of the USB and LSB digital sideband signals. The resulting aliasing has little effect on the digital subcarriers. Furthermore, the filter output frequency span is over +186 kHz after decimation. Since the digital sidebands span from about 100 kHz to 200 kHz on either end, the 14 kHz (200-186 kHz) of each end is aliased to the opposite end of the filter frequency span.

It is desirable to center the sideband near dc for subsequent processing. Therefore, a frequency shift is applied to the sidebands prior to FAC processing. In one example, the isolated USB is frequency-shifted by ⅜ of the sample rate, or −139.5 kHz, and the isolated LSB is frequency-shifted by +139.5 kHz. This shifts a potential first adjacent interferer to 60.5 kHz for the USB and −60.5 kHz for the LSB. The frequency shifting reduces complexity by allowing subsequent symmetric (real) halfband and quarterband filtering.

Figure 4:
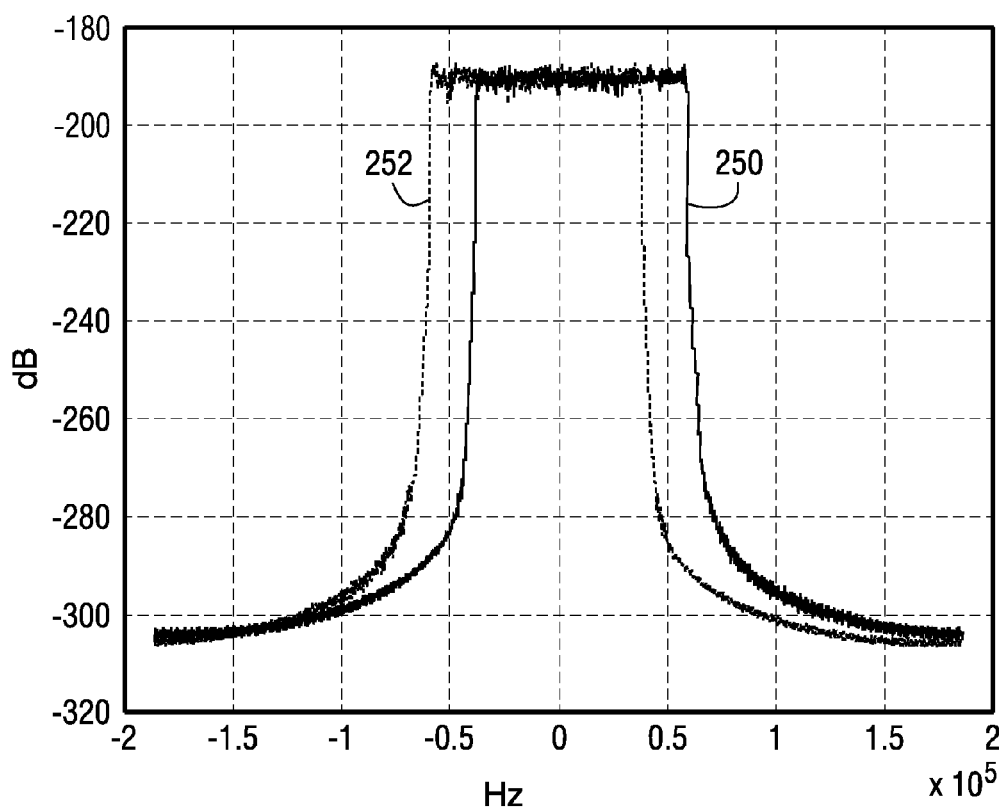
FIG. 4 is a graph illustrating upper and lower sideband signals frequency shifted toward DC.

In practice, the frequency shifting can be accomplished by mixing the input USB by $e^{j\pi n \cdot 3/4_n}$. In a similar manner, the input LSB is shifted by $e^{-j\pi n \cdot 3/4_n}$. This frequency shifting allows the complex phasor to be stored in a circular lookup table with only eight complex coefficients per cycle. The FAC input after frequency shifting is shown in FIG. 4, where the USB is curve 250, and the LSB is curve 252.

The FAC process is followed by a Halfband Filter which decimates by 2. This results in USB and LSB outputs at 186 ksps. Since the USB frequency was shifted by −139.5 kHz, and the LSB frequency was shifted by +139.5 kHz, the resulting digital sideband signals are centered near dc.

FAC Implementation

Figure 5:
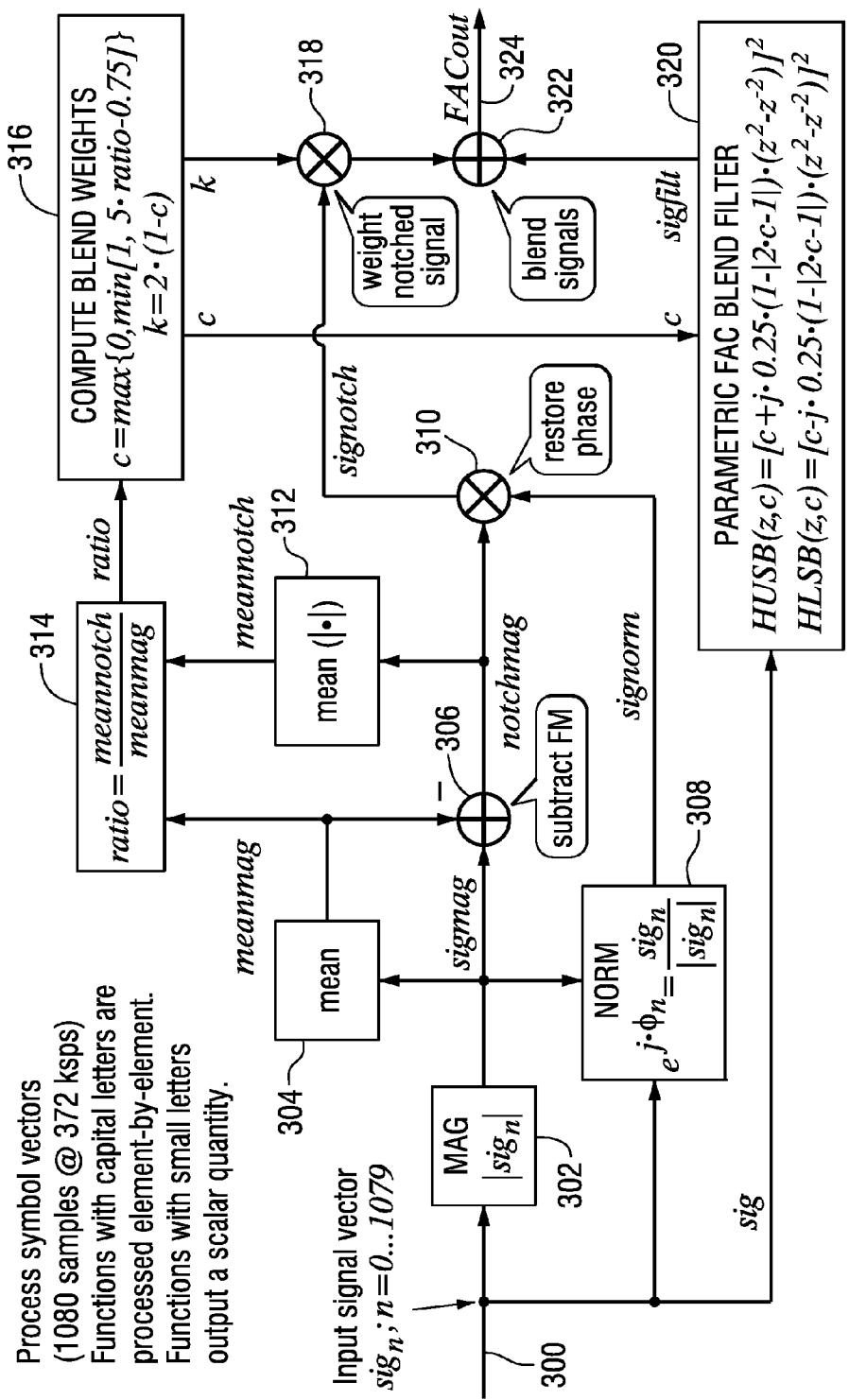
FIG. 5 is a functional block diagram of a first adjacent canceller.

A functional block diagram of a FAC is shown in FIG. 5. The input signal on line 300 is assumed to be a combination of one of the digital sidebands of an IBOC signal (also referred to as a desired sideband), a first adjacent FM interferer, and noise. The same FAC is separately applied to each digital sideband.

The FAC technique produces artifacts that spread noise across the entire signal bandwidth. To prevent corruption of the alternate sideband, the upper and lower primary sidebands are processed separately. Furthermore, FAC artifacts introduce significant interference to the spectrally coincident primary digital sideband.

First-adjacent cancellation is accomplished by tracking and rejecting the instantaneous FM carrier effectively using a dynamic notch filter. The instantaneous carrier frequency of an analog FM signal varies with time. To simplify the filtering of an FM interferer, its instantaneous carrier is mixed (down-converted) to dc through the magnitude (MAG) operation 302, to produce a first signal representative of the magnitude of the input signal. This allows the use of a dc notch filter 304, 306 to remove the FM interference, wherein block 304 produces a second signal representative of the mean magnitude of the first signal. Block 306 subtracts the second signal from the first signal to produce a notch-magnitude signal, and multiplier 310 combines the notch-magnitude signal with a normalized version of the input signal to produce the notch-filtered signal. The instantaneous FM interferer is also normalized 308 to produce a normalized input signal (signorm), thereby creating a local oscillator for returning the notch-filtered baseband signal to the frequency occupied by the input signal prior to down-conversion 310.

The dc notch filter is implemented as follows: Low-pass (mean) filtering 304 isolates the instantaneous FM interferer. The mean filtering replaces the lowpass IIR filter from previous implementations. This replacement allows a more efficient vector-processing implementation than recursive filtering operations. The isolated interferer is then subtracted 306 from the downconverted magnitude signal. The resulting notch filter output comprises the baseband input signal minus the extracted FM interference. The up-conversion component 310 then returns the notch-filtered signal (i.e., signotch) to its original phase/frequency by multiplying it with the notched signal.

In the example of FIG. 5, the meannotch filter 312 is used to estimate the magnitude of the remaining part of the notched signal. The meanmag and meannotch signals are used to compute a ratio of the magnitudes of the FM interferer to the digital signal.

The operation of the FAC algorithm implemented by the diagram of FIG. 5 can be described as follows. The sampled input signal can be represented in amplitude (magnitude) and phase form as $sig_n = a_n \cdot e^{j \cdot \Phi_n}$. These samples are indexed over a finite vector of elements comprising one OFDM symbol time, for convenience. The composite analog FM interferer plus desired digital sideband signals can further be represented as $$sig_n = a_n \cdot e^{j \cdot \Phi_n} = b_n \cdot e^{j \cdot \theta_n} + d_n,$$

where $b_n$ is the magnitude of the FM interferer, $\theta_n$ is the instantaneous phase of the FM interferer, and $d_n$ is the desired complex digital sideband signal. Additional noise, interference, or fading is not discussed in this analysis.

Assuming a commonly-implemented sample rate is 372 kHz, the input vector size is then 1080 complex samples, from n=0 . . . 1079. Samples from successive symbols are renumbered over the same range, but processed in succession while keeping track of the symbol count in a separate process. Samples are needed from adjacent symbols when the span of the filter impulse response extends beyond the symbol endpoints for proper convolution. In this case, the immediately previous symbol samples indexed 1077, 1078, and 1079 are re-indexed for convenience in this description as −3, −2, and −1, for example. Similarly, the first samples of the following symbol are indexed 1080, 1090, and 1091.

Assume that $b_n \gg |d_n|$ so that the FM capture effect is invoked. The signal magnitudes are assumed to be somewhat constant over the FAC vector processing size (about a symbol, or 1080 samples at 372 ksps). So the FAC is mostly unaffected by flat fading. However, frequency selective fading will result in FM-to-AM artifacts when estimating the FM amplitude b in the notch filter. The signal magnitude (sigmag from FIG. 1) or $|sig_n|$ is computed as $$|sig_n| = \sqrt{[b_n \cdot \cos(\theta_n) + \text{Re}\{d_n\}]^2 + [b_n \cdot \sin(\theta_n) + \text{Im}\{d_n\}]^2}$$
$$= \sqrt{b_n^2 + 2 \cdot b_n \cdot [\text{Re}\{d_n\} \cdot \cos(\theta_n) + \text{Im}\{d_n\} \cdot \sin(\theta_n)] + |d_n|^2}.$$

Since $b_n \gg |d_n|$, the following truncated series expansion approximation is useful:

$$\sqrt{b^2 + x} \cong b + \frac{x}{2 \cdot b}.$$

Furthermore, the FM capture effect implies that the phase of the digital signal plus FM interferer is approximated by the phase of the FM component, $\theta_n \cong \phi_n$. Then the magnitude of the input signal can be approximated by $$|sig_n| = b_n + [\text{Re}\{d_n\} \cdot \cos(\phi_n) + \text{Im}\{d_n\} \cdot \sin(\phi_n)] + \frac{|d_n|^2}{2 \cdot b_n}.$$

The purpose of the mean(sigmag) 304, or expected value E{sigmag}, is to estimate the magnitude of the FM interferer plus a small bias due to the digital signal and noise.

$$meanmag =$$
$$E\left\{b_n + [\text{Re}\{d_n\} \cdot \cos(\phi_n) + \text{Im}\{d_n\} \cdot \sin(\phi_n)] + \frac{|d_n|^2}{2 \cdot b_n}\right\} \cong b + E\left\{\frac{|d|^2}{2 \cdot b}\right\}.$$

The zero-mean terms of uncorrelated factors result in $E\{[\text{Re}\{d_n\} \cdot \cos(\phi_n) + \text{Im}\{d_n\} \cdot \sin(\phi_n)]\} = 0$. This value is subtracted from the input signal magnitude to form the notch filter output. This notch filter can be viewed as a spectral notch that tracks the instantaneous frequency of the FM signal, with $$notchmag_n \cong |sig_n| - \left(b + E\left\{\frac{|d|^2}{2 \cdot b}\right\}\right)$$

$$= \text{Re}\{d_n\} \cdot \cos(\theta_n) + \text{Im}\{d_n\} \cdot \sin(\theta_n) +$$

$$\left[b_n + \frac{|d_n|^2}{2 \cdot b_n} - \left(b + E\left\{\frac{|d_n|^2}{2 \cdot b}\right\}\right)\right].$$

Since the FM amplitude is assumed to be nearly constant over the filter time constant, then $b_n - b \cong 0$.

Furthermore, the term with $$\frac{|d_n|^2}{2 \cdot b_n}$$

is already assumed to be small, and its expected value is subtracted from it, making it negligible, so $$\frac{|d_n|^2}{2 \cdot b_n} - E\left\{\frac{|d|^2}{2 \cdot b}\right\} \cong 0.$$

Then the output of the notch filter can be approximated by $$notchmag_n \cong \text{Re}\{d_n\} \cdot \cos(\phi_n) + \text{Im}\{d_n\} \cdot \sin(\Phi_n).$$

Next, the output of the notch filter is multiplied 310 by the normalized phasor (signorm=$e^{j \cdot \Phi_n}$) of the input signal to restore the phase that was previously removed by the magnitude function.

$$signotch_n = notchmag_n \cdot signorm_n$$

$$\cong [\text{Re}\{d_n\} \cdot \cos(\phi_n) + \text{Im}\{d_n\} \cdot \sin(\phi_n)] \cdot e^{j\phi_n}$$

$$= [\text{Re}\{d_n\} \cdot \cos(\phi_n) + \text{Im}\{d_n\} \cdot \sin(\phi_n)] \cdot [\cos(\phi_n) + j \cdot \sin(\phi_n)]$$

$$= \text{Re}\{d_n\} \cdot [\cos^2(\phi_n) + j \cdot \cos(\phi_n) \cdot \sin(\phi_n)] + \text{Im}\{d_n\} \cdot$$

$$[j \cdot \sin^2(\phi_n) + \cos(\phi_n) \cdot \sin(\phi_n)]$$

The following three trig identities can be applied to simplify the previous expression:

$$\cos^2(\phi_n) = \frac{1}{2}[1 + \cos(2 \cdot \phi_n)]; \sin^2(\phi_n) = \frac{1}{2}[1 - \cos(2 \cdot \phi_n)];$$

$$\cos(\phi_n) \cdot \sin(\phi_n) = \frac{1}{2} \cdot \sin(2 \cdot \phi_n).$$

Substitution of the trig identities yields $$signotch_n \cong \text{Re}\{d_n\} \cdot \left[\frac{1 + \cos(2 \cdot \phi_n) + j \cdot \sin(2 \cdot \phi_n)}{2}\right] +$$

$$\text{Im}\{d_n\} \cdot \left[\frac{j + \sin(2 \cdot \phi_n) - j \cdot \cos(2 \cdot \phi_n)}{2}\right].$$

Further manipulation and simplification yields $$signotch_n \cong \frac{1}{2} \cdot d_n + \frac{1}{2} \cdot d_n^* \cdot e^{-j \cdot 2 \cdot \phi_n}.$$

The signotch output contains a digital signal term and an interference term. The signal term has half the magnitude of the desired digital sideband signal. The interference term has the same magnitude, but it is spread over frequency by the square of the FM signal spectrum ($e^{-j \cdot 2 \cdot \Phi_n}$). Then the interference density is determined by the convolution of the conjugate of the digital sideband spectrum with the square of the FM spectrum. This spectral spreading reduces the power spectral density of the interference in the bandwidth of the desired signal. Furthermore, the peak of the interference spectrum is offset from the desired signal because the FM interferer is centered at the extreme edge of the desired digital sideband spectrum. This spectral spreading results in a small but acceptable amount of aliasing when sampled at the 372 kHz complex sample rate.

Although the signal spectrum occupancy may indicate that the sideband could be sampled at a lower rate (such as 186 kHz) to reduce processing requirements, the aliasing becomes larger and especially degrades the inner extended optional OFDM partitions (i.e., P4 and P3 logical channels) when present.

FAC Blending

The first adjacent canceller generates artifacts that degrade the desired primary digital sideband. When the interference power is high relative to the power in the desired digital sideband, these artifacts are masked, and FAC processing significantly improves digital performance. However, as the level of interference decreases, the benefits of FAC processing diminish. At some point, FAC processing does more harm than good to the desired digital sideband.

Depending on the relative level of the FM interference, the first adjacent canceller output is blended between the FM notch-filtered signal and the parametric-filtered input signal. The relative proportion of the two signals is determined by measuring the relative amount of interference removed by the notch filter. This measurement is performed by comparing the energy present at the input and output of the notch filter. As a result, as the relative level of interference increases or decreases, the notch-filtered signal is smoothly "blended" into or out of the first adjacent canceller output, respectively.

The blend ratio component 314 measures the power of the FM interference relative to the power of the desired digital sideband, and calculates the proper mixture of processed and non-processed signals. As shown in FIG. 5, block 304 determines a mean of the notch-magnitude signal, block 314 determines a ratio of the mean of the notch-magnitude signal and the second signal. Block 318 uses the ratio to compute first and second blend parameters (k and c). Blend parameter k is used to produce the weighting the notch-filtered signal.

This ratio is computed as the ratio of the mean of the sigmag vector to the mean of the absolute values of elements of the notchmag vector. As shown in block 316, this ratio is then used to compute the pair of blend parameters c and k.

$$c = \max\{0, \min[1, 5 \cdot \text{ratio} - 0.75]\}$$

$$k = 2 \cdot (1 - c).$$

The blend parameter k simply weights the summing of the FM-notched signal signotch in multiplier 318 to produce a weighted notch-filtered signal. The blend parameter c is used to compute the coefficients of the Parametric FAC Blend Filter, which shapes the spectrum of the unprocessed input signal. This is preferable over previous techniques where the unprocessed signal was unfiltered and uncompensated for the non-uniform, bell-shaped FM interference spectrum. The spectrum is shaped to apply more attenuation to the spectral portion of the unprocessed signal that is most affected by the FM interferer (i.e., near ±200 kHz).

The parametric filter 320 applies greater attenuation when the ratio indicates that the interfering FM signal is greater. Blend parameter c is used as a coefficient in the parametric filter.

The goal is to maximize the signal-to-noise ratio (SNR) of each subcarrier across the digital sideband. A linear-phase FIR filter is designed with complex coefficients that were empirically determined to approximate Maximum Ratio Combining (MRC) for each of the subcarriers. MRC is a technique where signals (subcarriers in this case) are combined from the notched-processed and filtered bypass (input) signals in proportion to their SNRs. The SNR of both the notch-processed and filtered bypass signals were determined and measured by simulation with a typical FM first adjacent interferer. The Parametric FAC Blend Filter is defined by its z-transform in non-causal form, assuming group delay compensation by 4 samples is appropriately applied. The z-transform expressions for the USB and LSB filters are:

$$HUSB(z, c) = [c + j \cdot 0.25 \cdot (1 - |2 \cdot c - 1|) \cdot (z^2 - z^{-2})]^2$$
$$HLSB(z, c) = [c - j \cdot 0.25 \cdot (1 - |2 \cdot c - 1|) \cdot (z^2 - z^{-2})]^2.$$

Figure 6:
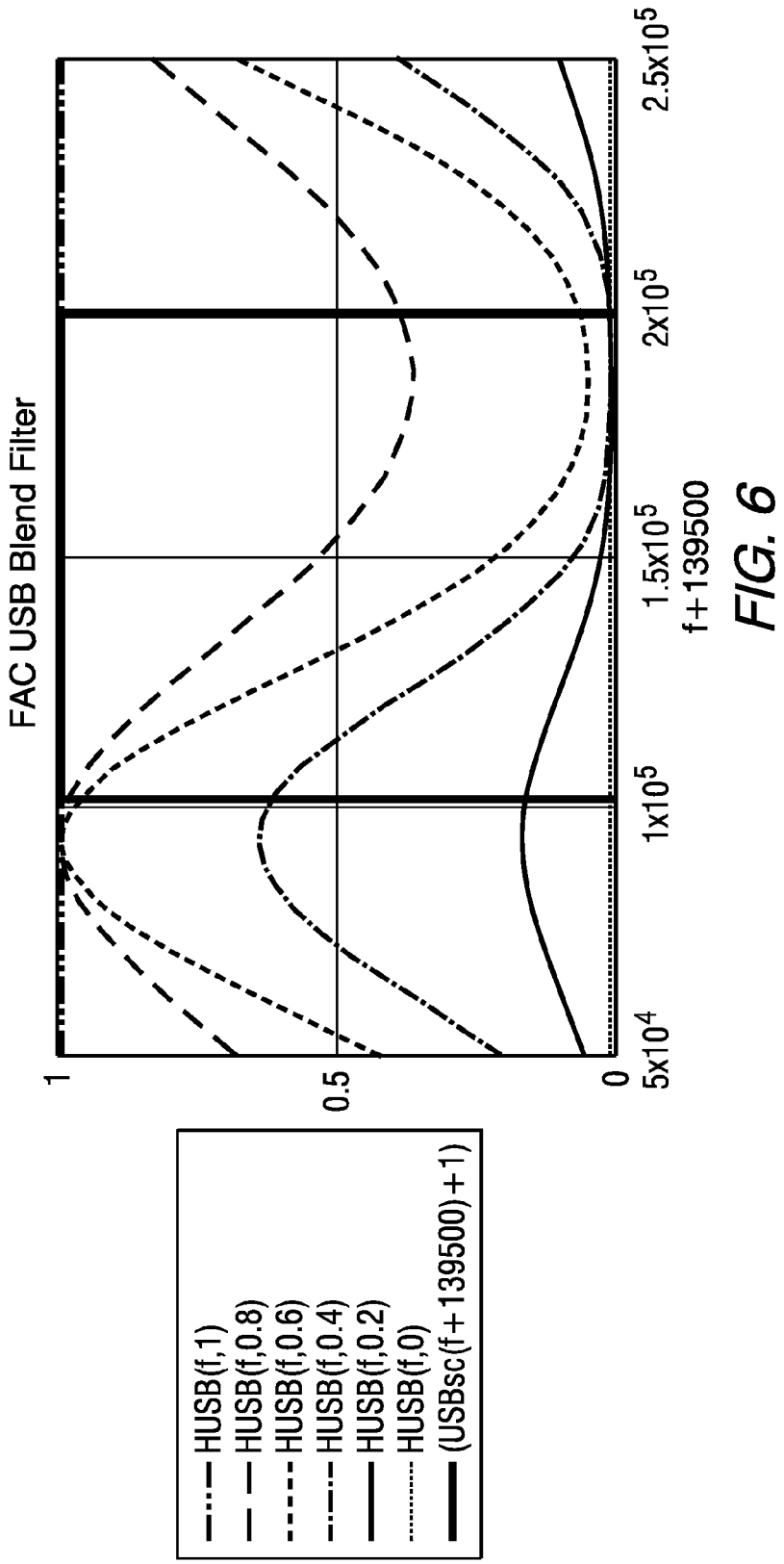
FIG. 6 is a functional block diagram of isolation filters with a parametric FAC blend filter.

The weighted notch-filtered signal and the output of the parametric filter (i.e., the parametric-filter signal) are combined in summation point 322 to produce an FAC output signal on line 324. The spectrum of the Parametric FAC Blend Filter is shown in FIG. 6. The frequency spectrum of the USB for this plot is shifted by +139.5 kHz to show the actual frequency before the −139.5 kHz shift from FIG. 3. So the upper edge of the digital sideband is near 200 kHz while the lower edge of the digital sideband is near 100 kHz, as shown in FIG. 6. FIG. 6 shows 6 spectral plots corresponding to 6 values of c over its range of 0.0, 0.2, 0.4, 0.6, 0.8, and 1.0. A plot of the digital sideband spanning approximately 100 kHz to 200 kHz is also shown. The filter has the most attenuation (no signal) when c=0, and no attenuation when c=1. When c is between 0 and 1, the spectrum is shaped to provide more attenuation at the frequencies near 200 kHz.

The FAC Parametric Blend Filter requires samples beyond either end of the symbol-size vector, because of the FIR filter span. This could be inconvenient. Zero-value signal samples could be appended to the ends of the input vector instead of the actual samples from adjacent vectors, to aid in convolution of the FIR filter taps. The degradation should be minimal and there is no degradation when FAC is not blended in.

Context and Implementation

A small but acceptable amount of FAC aliasing results when the FAC algorithm runs at the 372 kHz complex sample rate, or decimation-by-2. This aliasing becomes larger and more damaging to the P3 and P4 logical channels when FAC is run at a 186 kHz sample rate, or decimation-by-4. As a result, some minor modifications to the Isolation Filter and FAC algorithm are recommended for decimate-by-4, 186 kHz implementations. Although operating at 186-kHz (fs/4) is not recommended, the enhanced FAC algorithm can be enabled at all times at this reduced sample rate to save processor throughput.

Figure 7:
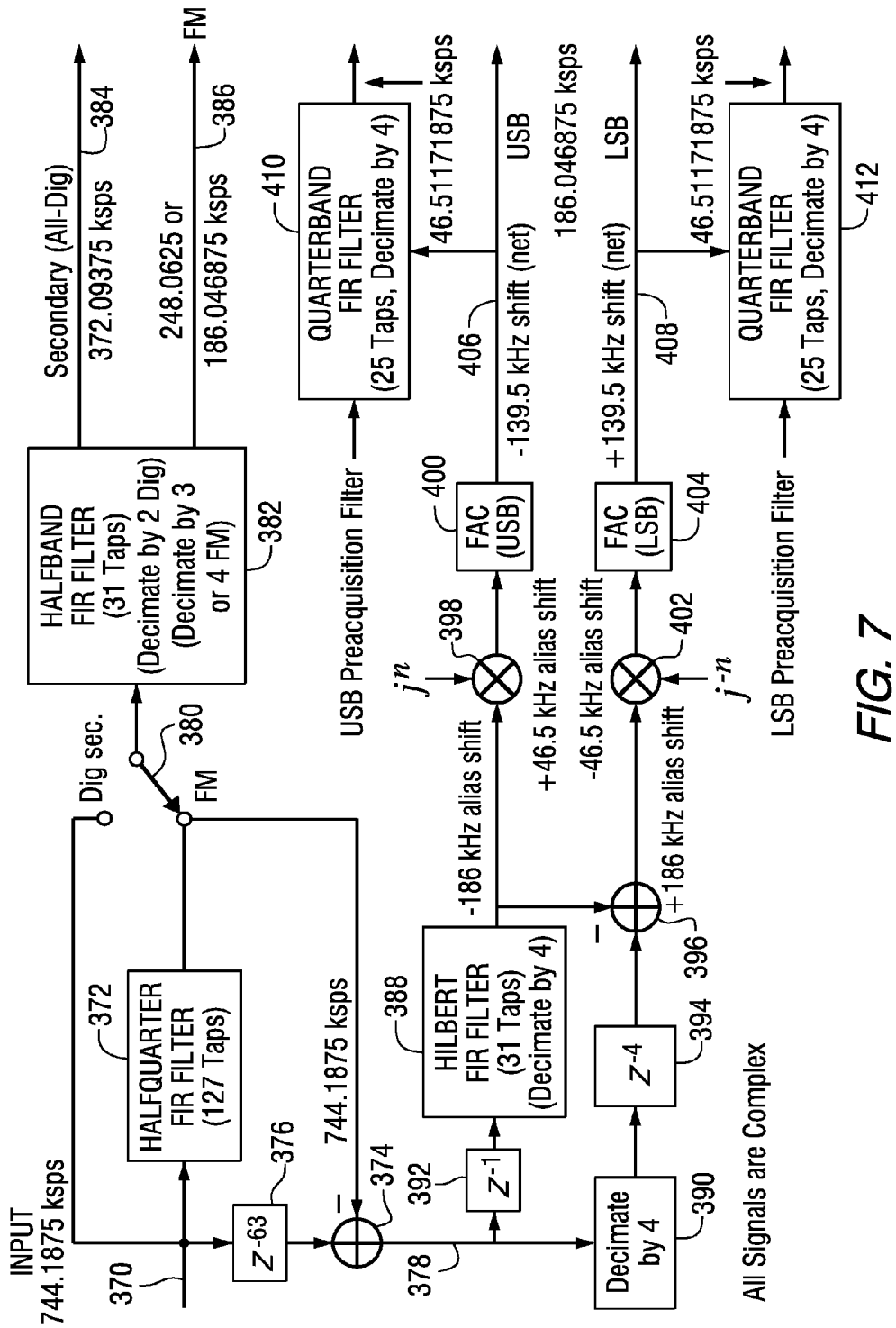
FIG. 7 is a functional block diagram of another first adjacent canceller for a decimate-by-4 sample rate.

A block diagram of the modified Isolation Filters for the decimation-by-4 (186 ksps) option is shown in FIG. 7. As in the example of FIG. 3, the isolation filters of FIG. 7 separate the upper and lower primary digital sidebands from either the analog FM signal (hybrid waveform) or the secondary digital subcarriers (all-digital waveform). This separation allows the analog FM signal and digital sidebands to be sampled at a lower rate for subsequent efficient processing, and enables independent signal acquisition and FAC processing on either digital sideband. In FIG. 7, all signals are complex.

An input signal at a sample rate of 744.1875 ksps is supplied on line 370. Halfquarter FIR filter 372 filters the analog modulated portion of the input signal to produce an FM output that is subtracted at combiner 374 from the input signal that has been delayed as shown in block 376. This produces a signal on line 378 representing the signal on the digitally modulated subcarriers of the received IBOC signal. Switch 380 connects the digital input signal or the filtered FM signal to a halfband FIR filter 382, to produce a secondary all-digital signal on line 384 and a sampled FM signal on line 386.

The signal on line 378 is separated into upper and lower digital sideband signals as shown by the Hilbert FIR filter 388, decimate by two block 390, delays 392 and 394, and combiner 396. The upper digital sideband signal is frequency shifted as shown by multiplier 398 and passed to an USB first adjacent canceller 400. The lower digital sideband signal is frequency shifted as shown by multiplier 402 and passed to a LSB first adjacent canceller 404.

The FAC's output an upper sideband signal on line 406 and a lower sideband signal on line 408. An upper sideband preacquisition filter 410 and a lower sideband preacquisition filter 412 are also included.

Note that the Hilbert FIR now decimates by 4 so that the FAC algorithm can run at the reduced sample rate. Another difference from the fs/2 implementation of FIG. 3 is that the aliases from the Hilbert FIR output are shifted by $-j^n$. This yields the same net frequency shift of +139.5 kHz that is used in the decimation-by-2 implementation.

Figure 8:
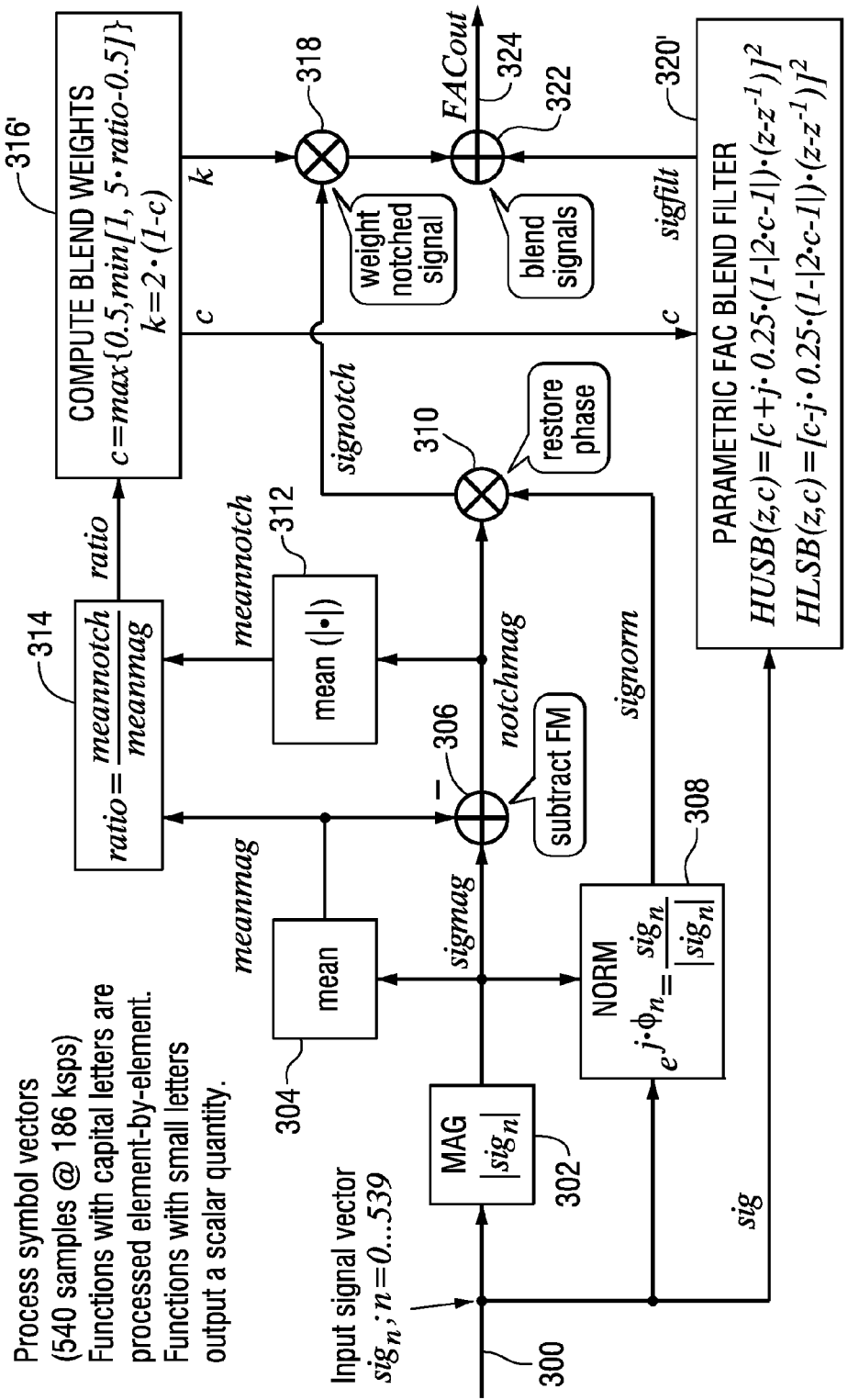
FIG. 8 is a functional block diagram of another first adjacent canceller for a decimate-by-4 sample rate.

FIG. 8 is a functional block diagram of the FAC for decimation-by-4 operation. There are only two changes to the FAC algorithm from that previously illustrated in FIG. 5. The first modification is the expression in block 316' for the FAC Blend Weight c.

$$c = \max\{0.5, \min[1, 5 \cdot \text{ratio} - 0.5]\}.$$

The second change is that the Parametric FAC Blend Filter tap spacing in block 320' is decreased from two samples to one sample.

$$HUSB(z, c) = [c + j \cdot 0.25 \cdot (1 - |2 \cdot c - 1|) \cdot (z - z^{-1})]^2$$
$$HLSB(z, c) = [c - j \cdot 0.25 \cdot (1 - |2 \cdot c - 1|) \cdot (z - z^{-1})]^2.$$

Figure 9:
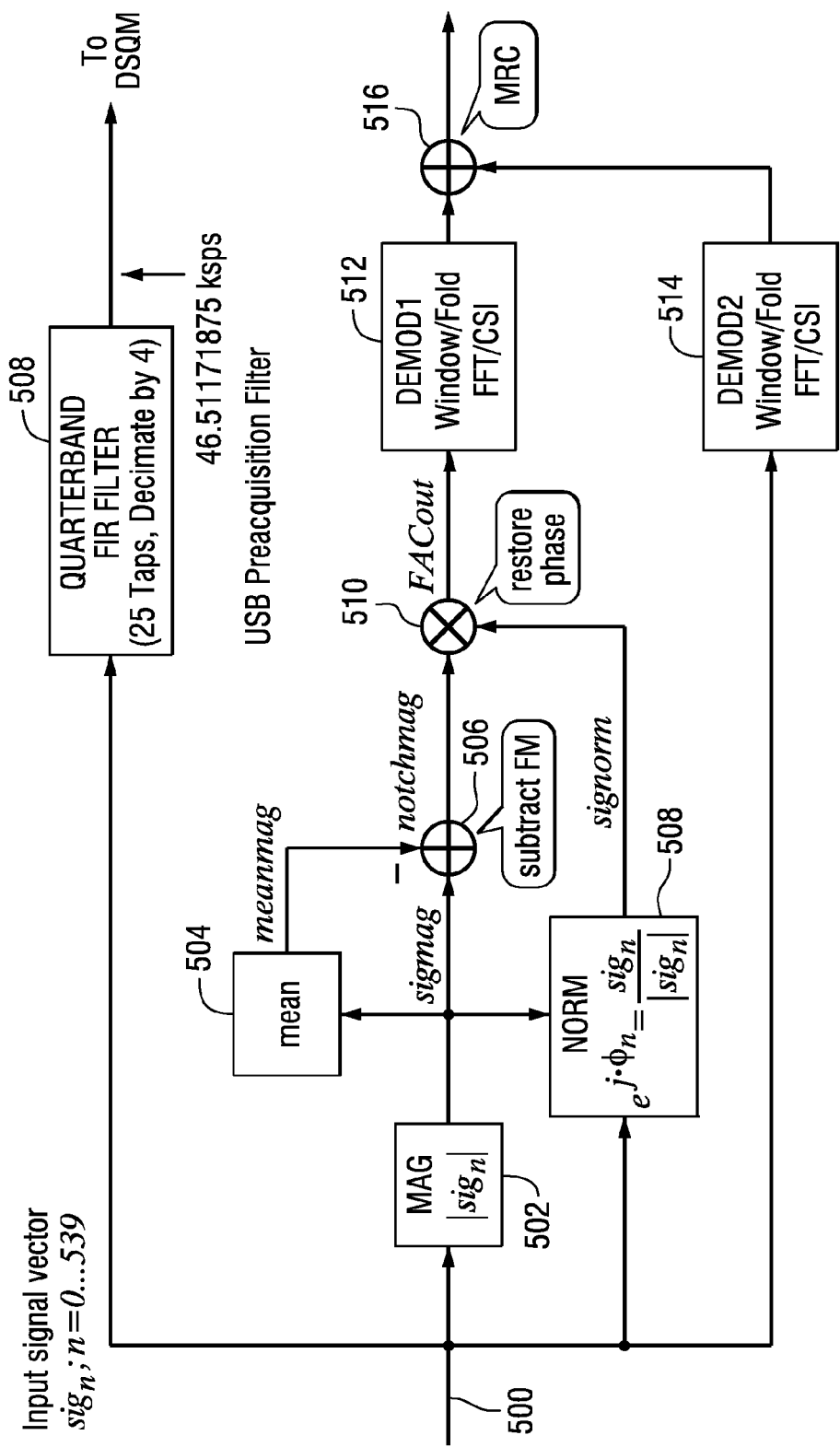
FIG. 9 is a functional block diagram showing Maximum Ratio Combining to blend a First Adjacent Canceller processed signal and a bypass signal.

A Maximum Ratio Combining (MRC) technique could be used to blend the FAC-processed signal and the bypass signal, replacing the Parametric FAC Blend Filter. This technique is illustrated in FIG. 9. A signal vector is input on line 500. First-adjacent cancellation is accomplished by tracking and rejecting the instantaneous FM carrier effectively using a dynamic notch filter. The instantaneous carrier frequency of an analog FM signal varies with time. To simplify the filtering of an FM interferer, its instantaneous carrier is mixed (down-converted) to dc through the magnitude (MAG) operation 502. This allows the use of a dc notch filter 504, 506 to remove the FM interference. The instantaneous FM interferer is also normalized 508, thereby creating a local oscillator for returning the notch-filtered baseband signal to the frequency occupied by the input signal prior to down-conversion 510.

Separate OFDM demodulators 512, 514 are used in each path, requiring increased processing capability for the additional demodulator. The corresponding weighted and equalized bit metrics would be combined by simple addition 516. This method eliminates the need for estimating the ratio of the interferer and digital sideband levels. The MRC performance should be better than the parametric filter blending techniques because it reacts to the changing modulation of the FM interferer for each symbol. A preacquisition filter 508 is included for the upper sideband signal.

The various signal-processing methods described above can be implemented in a radio receiver or other apparatus having an input for receiving the radio signal and one or more processors or other processing circuitry programmed or otherwise configured to perform the signal processing needed to implement the processes.

In one embodiment, the methods described herein can be implemented in a radio receiver including an input receiving an original FM in-band on-channel radio signal including a plurality of digitally modulated subcarriers in upper and lower sidebands; and processing circuitry for sampling the FM in-band on-channel radio signal to produce an input signal including complex digital samples of a combination of a desired one the upper and lower sidebands and an FM interferer, removing FM interferer components from the first signal by notch filtering to produce a notch-filtered signal, weighting the notch-filtered signal to produce a weighted notch-filtered signal, using a parametric filter to filter the input signal to produce a parametric-filtered input signal, and combining the weighted notch-filtered signal and the parametric-filtered input signal to produce an output signal.

In various embodiments of the radio receiver, the relative proportion of the weighted notch-filtered signal and the parametric-filtered input signal can be determined by measuring the relative amount of interferer removed by the notch filter. The processing circuitry can be configured to remove FM interferer components of the input signal by notch filtering to produce a notch-filtered signal by: producing a first signal representative of the magnitude of the input signal, producing a second signal representative of the mean magnitude of the first signal, subtracting the second signal from the first signal to produce a notch-magnitude signal, and multiplying the notch-magnitude signal with a normalized version of the input signal to produce the notch-filtered signal. The processing circuitry can be configured to determine a mean of the notch-magnitude signal, to determine a ratio of the mean of the notch-magnitude signal and the second signal, to use the ratio to compute first and second blend parameters, and to use the first blend parameters to produce the weighting the notch-filtered signal. The processing circuitry can use the second blend parameters as coefficients of the parametric filter. The radio receiver parametric filter can shape the spectrum of the input signal to apply more attenuation to a spectral portion of the input signal that is most affected by the FM interferer. The ratio can represent the power of the FM interferer relative to the power of the desired digital sideband. The processing circuitry can append zero-value signal samples to ends of the input signal prior to using a parametric filter to filter the input signal to produce a parametric-filtered input signal. The processing circuitry can separate the complex digital samples from the upper and lower sidebands, frequency shifts the complex digital samples from the upper and lower sidebands to produce complex baseband digital samples from the upper and lower sidebands, and uses the isolation filters to separately process the complex baseband digital samples from the upper and lower sidebands.

While the present invention has been described in terms of several embodiments, it will be understood by those skilled in the art that various modifications can be made to the disclosed embodiments without departing from the scope of the invention as set forth in the claims.

What is claimed is:

1. A method for processing a radio signal comprising:
  receiving an FM in-band on-channel radio signal including a plurality of digitally modulated subcarriers in upper and lower sidebands;
  sampling the FM in-band on-channel radio signal to produce an input signal including complex digital samples of a combination a desired one the upper and lower sidebands and an FM interferer;
  removing FM interferer components from the first signal by notch filtering to produce a notch-filtered signal;
  weighting the notch-filtered signal to produce a weighted notch-filtered signal;
  using a parametric filter to filter the input signal to produce a parametric-filtered input signal; and
  combining the weighted notch-filtered signal and the parametric-filtered input signal to produce an output signal.

2. The method of claim 1, wherein the relative proportion of the weighted notch-filtered signal and the parametric-filtered input signal is determined by measuring the relative amount of interferer removed by the notch filter.

3. The method of claim 1, wherein removing FM interferer components of the input signal by notch filtering to produce a notch-filtered signal comprises:
  producing a first signal representative of the magnitude of the input signal;
  producing a second signal representative of the mean magnitude of the first signal;
  subtracting the second signal from the first signal to produce a notch-magnitude signal; and
  multiplying the notch-magnitude signal with a normalized version of the input signal to produce the notch-filtered signal.

4. The method of claim 1, wherein prior to using a parametric filter to filter the input signal to produce a parametric-filtered input signal, zero-value signal samples are appended to ends of an input signal vector.

5. The method of claim 1, further comprising:
  separating the complex digital samples from the upper and lower sidebands;
  frequency shifting the complex digital samples from the upper and lower sidebands to produce complex baseband digital samples from the upper and lower sidebands; and
  using the isolation filters to separately process the complex baseband digital samples from the upper and lower sidebands.

6. The method of claim 3, further comprising:
  determining a mean of the notch-magnitude signal;
  determining a ratio of the mean of the notch-magnitude signal and the second signal;
  using the ratio to compute first and second blend parameters; and
  using the first blend parameters to produce the weighting for the notch-filtered signal.

7. The method of claim 5, wherein:
  complex baseband digital samples from the upper and lower sidebands upper and lower sideband isolation filters each have a passband located between 100 kHz and 270 kHz from a center frequency of the FM in-band on-channel radio signal.

8. The method of claim 6, further comprising:
using the second blend parameters as coefficients of the parametric filter.

9. The method of claim 6, wherein the ratio represents the power of the FM interferer relative to the power of the desired digital sideband.

10. The method of claim 8, wherein the parametric filter shapes the spectrum of the input signal to apply more attenuation to a spectral portion of the input signal that is most affected by the FM interferer.

11. A radio receiver comprising:
an input receiving an original FM in-band on-channel radio signal including a plurality of digitally modulated sub-carriers in upper and lower sidebands; and
processing circuitry for sampling the FM in-band on-channel radio signal to produce an input signal including complex digital samples of a combination of a desired one the upper and lower sidebands and an FM interferer, removing FM interferer components from the first signal by notch filtering to produce a notch-filtered signal, weighting the notch-filtered signal to produce a weighted notch-filtered signal, using a parametric filter to filter the input signal to produce a parametric-filtered input signal, and combining the weighted notch-filtered signal and the parametric-filtered input signal to produce an output signal.

12. The radio receiver of claim 11, wherein the relative proportion of the weighted notch-filtered signal and the parametric-filtered input signal is determined by measuring the relative amount of interferer removed by the notch filter.

13. The radio receiver of claim 11, wherein the processing circuitry removes FM interferer components of the input signal by notch filtering to produce a notch-filtered signal by: producing a first signal representative of the magnitude of the input signal, producing a second signal representative of the mean magnitude of the first signal, subtracting the second signal from the first signal to produce a notch-magnitude signal, and multiplying the notch-magnitude signal with a normalized version of the input signal to produce the notch-filtered signal.

14. The radio receiver of claim 11, wherein the processing circuitry appends zero-value signal samples to ends of the input signal prior to using a parametric filter to filter the input signal to produce a parametric-filtered input signal vector.

15. The radio receiver of claim 11, wherein the processing circuitry separates the complex digital samples from the upper and lower sidebands, frequency shifts the complex digital samples from the upper and lower sidebands to produce complex baseband digital samples from the upper and lower sidebands, and uses the isolation filters to separately process the complex baseband digital samples from the upper and lower sidebands.

16. The radio receiver of claim 13, wherein the processing circuitry determines a mean of the notch-magnitude signal, determines a ratio of the mean of the notch-magnitude signal and the second signal, uses the ratio to compute first and second blend parameters, and uses the first blend parameters to produce the weighting the notch-filtered signal.

17. The radio receiver of claim 15, wherein:
complex baseband digital samples from the upper and lower sidebands upper and lower sideband isolation filters each have a passband located between 100 kHz and 270 kHz from a center frequency of the FM in-band on-channel radio signal.

18. The radio receiver of claim 16, wherein the processing circuitry uses the second blend parameters as coefficients of the parametric filter.

19. The radio receiver of claim 16, wherein the ratio represents the power of the FM interferer relative to the power of the desired digital sideband.

20. The radio receiver of claim 18, wherein the parametric filter shapes the spectrum of the input signal to apply more attenuation to a spectral portion of the input signal that is most affected by the FM interferer.

* * * * *